US007748878B2

(12) United States Patent
Lee

(10) Patent No.: US 7,748,878 B2
(45) Date of Patent: Jul. 6, 2010

(54) LIGHTING CONTROL SYSTEM WITH WIRELESS NETWORK CONNECTION

(75) Inventor: Robin Lee, Hamburg, NJ (US)

(73) Assignee: Production Resource Group, Inc., New Windsor, NY (US)

( * ) Notice: Subject to any disclaimer, the term of this patent is extended or adjusted under 35 U.S.C. 154(b) by 647 days.

(21) Appl. No.: 11/748,996

(22) Filed: May 15, 2007

(65) Prior Publication Data

US 2007/0268680 A1 Nov. 22, 2007

Related U.S. Application Data

(60) Provisional application No. 60/801,252, filed on May 18, 2006.

(51) Int. Cl.
*B60Q 1/06* (2006.01)
*H04B 1/38* (2006.01)

(52) U.S. Cl. ...................... 362/386; 362/233; 362/418; 340/5.61

(58) Field of Classification Search .................. 362/85, 362/233, 386, 418, 419, 287; 315/316; 340/5.61, 340/5.62, 5.63
See application file for complete search history.

(56) References Cited

U.S. PATENT DOCUMENTS

| | | | | |
|---|---|---|---|---|
| 5,010,459 | A * | 4/1991 | Taylor et al. | 362/85 |
| 5,988,817 | A * | 11/1999 | Mizushima et al. | 353/94 |
| 6,441,770 | B2 * | 8/2002 | Russell | 341/176 |
| 6,507,773 | B2 * | 1/2003 | Parker et al. | 700/258 |
| 6,664,745 | B2 * | 12/2003 | Belliveau | 315/315 |
| 6,803,728 | B2 * | 10/2004 | Balasubramaniam et al. | 315/149 |
| 6,866,402 | B2 * | 3/2005 | Belliveau | 362/272 |
| 7,635,188 | B2 * | 12/2009 | Belliveau et al. | 353/30 |
| 2005/0200318 | A1 * | 9/2005 | Hunt et al. | 315/316 |

* cited by examiner

*Primary Examiner*—Ali Alavi
(74) *Attorney, Agent, or Firm*—The Law Office of Scott C. Harris, Inc.

(57) ABSTRACT

Wireless network used to control multiple lights, includes multiple different networks for different purposes, and interference prevention mechanisms.

17 Claims, 1 Drawing Sheet

LIGHTING CONTROL SYSTEM WITH WIRELESS NETWORK CONNECTION

CROSS-REFERENCE TO RELATED APPLICATIONS

This application claims priority to U.S. Provisional Application 60/801,252, filed May 18, 2006. The disclosure of the prior application is considered part of (and is incorporated by reference in) the disclosure of this application.

BACKGROUND

Stage lighting control systems are known, and/or described, for example, in various patents owned by Production Resource Group L.L.C. Many of these patents describe a central console being used to create commands for a number of lights collectively forming a lighting effect or lighting show. Each of the lights, for example, may be capable of projecting a light beam of 100-200 W or more, may be capable of light beam movement in pan and/or tilt directions, and light beam shaping, done by a gobo.

The connection to the lights is typically done over wires, for example using DMX, or using the so-called Arcnet protocol which provides DMX over ethernet. It has been suggested that control of lights using commands sent directly over wired ethernet may also be carried out.

SUMMARY

The present application describes wireless control of lights in a stage lighting scenario.

BRIEF DESCRIPTION OF THE DRAWINGS

These and other aspects will now be described in detail with reference to the accompanying drawings wherein.

DETAILED DESCRIPTION

The general structure and techniques, and more specific embodiments which can be used to effect different ways of carrying out the more general goals are described herein.

Figure 1:
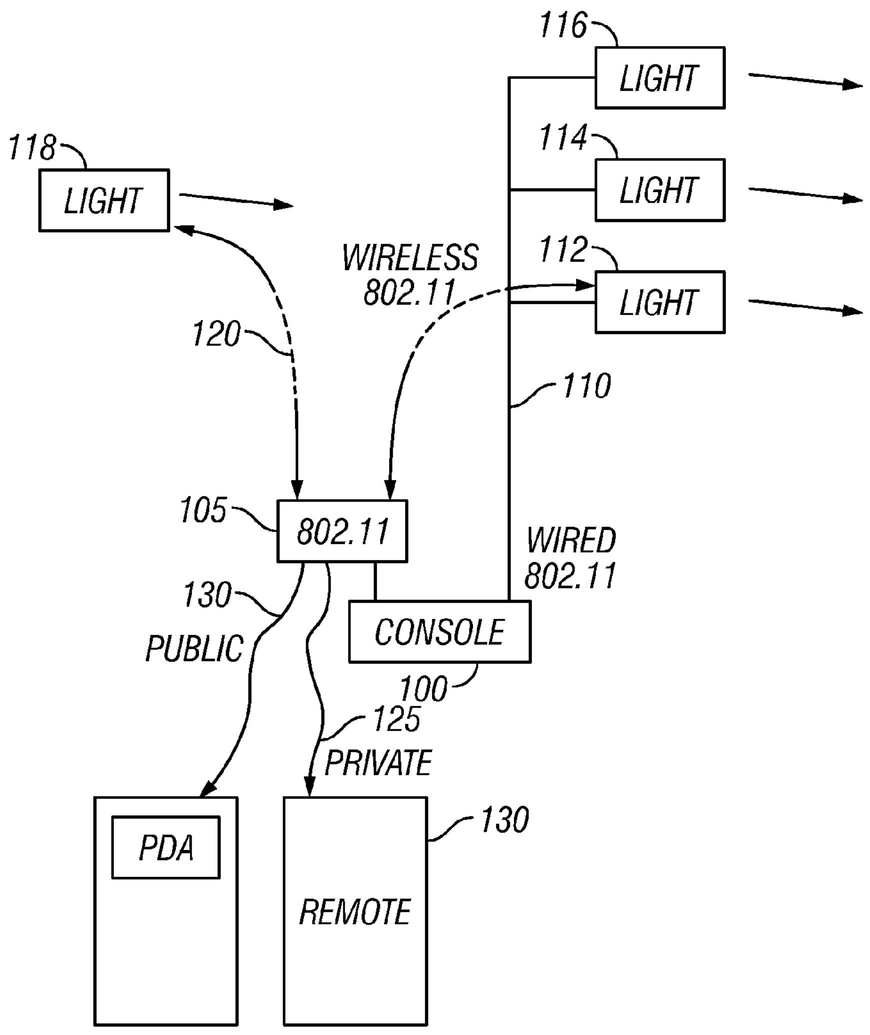
FIG. 1 shows a system diagram showing the console connected to control a number of lights.

An embodiment is shown in FIG. 1. A lighting control console 100, which may be the PRG Virtuoso console, or may be any other console which is capable of controlling multiple remote lights.

A first connection 110 is a conventional wired connection which may connect to a number of conventional lights such as 112, 114. These conventional lights may be of a type which are only controllable via wired connections. Virtually every stage light today available is controllable in this way.

Light 112 is capable of receiving both wired connections and wireless connections. The console 100 has a wireless communication module 105 which enables connection to wireless-enabled lights such as 112.

Figure 2:
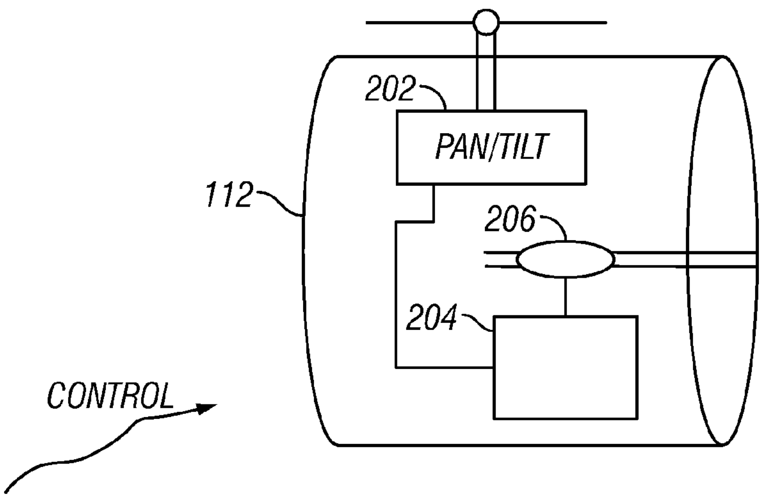
FIG. 2 illustrates a light and wireless control.

An exemplary light 112 shown in FIG. 2 has a pan and tilt motor 202, a controller 204, and a lamp 206.

Light 118, also controlled by console 100, has a connection only via the wireless connection shown as 120.

Any of the lights 112, 114, 116, however, may be stage light type devices, that is may be remotely controllable to change their pan and tilt orientation, and thereby change the position at which the light is directed. The light may be mountable on a truss or other supporting device, and may preferably project a light beam having an intensity of at least 100 W. In addition, the light can be provided with a built-in functionality for wireless control, or may have an add-in functionality for such wireless control.

In an embodiment, the wireless device 105 may also produce two additional wireless streams. The wireless stream 125 is a private stream. The private stream 125 enables administrative functions to be carried out either on the console, or on the controlled lights.

For example, a remote 130 can connect to the private stream. The remote 130, for example, can enable a lighting designer or other operator who is operating using a laptop or tablet style computer to carry out functions on the console or the lamps. The remote may be a dedicated laptop that runs a light version of the software on the console, and accepts commands either over the keyboard, or through the mouse or other GUI based commands.

Alternatively, the remote may control using a web browser style interface, produced by the console 100, and routed to the private network 125. The web browser can run based on console software, thereby automatically updating that software whenever the main console software is updated.

A public wireless connection 130 may also be provided. The public wireless connection may be itself controlled by the console. For example, while the console controls lighting effects by the lights 112, 114, 116, 118, it has the ability to control many different lights. The public connection 130 may be intended to control yet another "light"; however this "light" can be any mobile phone, PDA or other unit that is in range of the wireless connection. In this way, the lighting designer is able to stream video and/or other show media and lighting information to the holder of the PDA.

Any PDA with 802.11 wireless capability, or other data capability such as cellular, Bluetooth or other, may also receive the lighting information. The public stream 130 may alternatively be conveyed over other formats, such as Bluetooth.

This forms three different streams of information which are sent from the console: the controlling information to the lights, the status information to a remote, and the public information. The public information may be transmitted with virtually no security, since it is intended to be received by any user in the vicinity of the information.

However, the private line 125 and the control lines 120 should be secured. The private line should be secured against hackers, since otherwise anyone with knowledge of the system could hack in and change the show or change other parameters. For example, this security may use any of the encryption protocols which are associated with the wireless networking, and preferably uses the strongest possible encryption.

However, the control protocols require not only protection against hacking, but also protection against interference. During the shows, many electronic devices are operating. Many users may have cell phones, and many persons in the audience may also have cell phones. Cell phones, and especially GSM cell phones, may cause interference. In addition, there are moving motors and other items which may cause interference. Accordingly, the stream 120 may be interference protected. This may be done by using a spread spectrum form of 802.11, for example, or by using an extremely error corrected form of 802.11. In the most extreme case, each command may be sent four or five times, and the light is instructed to respond to a command only when the command is properly received multiple times in a row.

According to another embodiment, the commands may be sent along with a hash value indicative of the commands, so that the light may compare the command with the hash value to ensure that the command was properly received. The light may send an acknowledgment when the command and hash are properly received. Otherwise, the command is eventually re-sent.

Some lights, such as 114, are legacy devices, and will not be controllable over the wireless control. Other lights, however, such as 112, will be controlled both via wired and wireless. These two different networks may form additional levels of communication for the light, and may enable other things.

Another aspect allows using any of the network connections described herein to forward digital content (which could include video content) wirelessly, using the techniques described herein.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other wireless networking protocols are contemplated, including Wimax, Zigbee, and others.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The consoles and computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A stage lighting device, comprising:

a mounting part, allowing mounting a light;

a controllable motor, that allows moving the light in at least pan and tilt directions;

a light source, producing an output of at least 100 W; and a controller, that controls at least said movement in said pan and tilt directions, and controls said light source, wherein said controller includes a wireless network interface device, which receives commands over a wireless network, and said controller operates to accept a command from a wireless network only if a specified security function is met.

2. A device as in claim 1, wherein said specified security function includes receiving the same command more than once.

3. A device as in claim 1, wherein said specified security function includes a feature beyond the encryption that is built into the wireless network.

4. A device as in claim 1, wherein said specified security function includes a hash function, associated with a control that is sent, and said light responding to a command only when said hash function is properly received.

5. A stage lighting controller device, comprising:

a user interface, adapted for controlling a plurality of stage lighting devices, each of which are controllable remotely, and also controllable at least to move in pan and tilt directions; and a wireless connection to said stage lighting devices, said wireless connection producing commands to control said plurality of stage lighting devices, and producing at least one security function as part of said commands.

6. A controller device as in claim 5, wherein said security function is a function beyond any encryption built into a protocol of the wireless network.

7. A controller device as in claim 6, wherein said security function includes sending multiple commands until a confirmation of a command is received.

8. A controller device as in claim 6, wherein said security function comprises sending a hash function.

9. A controller device as in claim 5, wherein said wireless connection includes multiple different wireless connections, each directed to a different type of unit.

10. A controller device as in claim 9, wherein said wireless connections includes a first wireless connection connectable to stage lighting devices, and the second wireless connection connectable to remote controllable devices.

11. A controller device as in claim 10, wherein said second wireless connection connects to a dedicated remote computer.

12. A controller device as in claim 10, wherein said second wireless connection produces signals that define an Internet webpage that can be used to control said controller device.

13. A controller device as in claim 10, wherein said wireless connections further include a third wireless connection, connectable to personal communication devices, and which controls effects being carried out on said personal communication devices.

14. A controller device as in claim 5, wherein said wireless connection is wireless ethernet.

15. A method, comprising:

sending a control signal wirelessly from a controlling console to a controlled stage light of a type that can be controlled to change its movement in at least pan and tilt directions; and using an encryption function that is part of the wireless network format, and also adding an additional security function as part of said control signal, such that the controlled stage light will not respond to the command unless the additional security function is verified by the stage light.

16. A method as in claim 15, wherein the additional security function includes sending commands more than once prior to their execution.

17. A method as in claim 15, wherein the additional security function includes sending commands with hash codes that confirm contents of the commands.

* * * * *